United States Patent
Nakagawa et al.

(10) Patent No.: US 7,170,243 B2
(45) Date of Patent: Jan. 30, 2007

(54) DRIVE METHOD FOR BRUSHLESS MOTOR AND DRIVE CONTROL APPARATUS THEREFOR

(75) Inventors: Akihiro Nakagawa, Tokyo (JP); Jun Suzumura, Tokyo (JP)

(73) Assignee: Mitsubishi Denki Kabushiki Kaishia, Tokyo (JP)

( * ) Notice: Subject to any disclaimer, the term of this patent is extended or adjusted under 35 U.S.C. 154(b) by 0 days.

(21) Appl. No.: 11/311,313

(22) Filed: Dec. 20, 2005

(65) Prior Publication Data

US 2006/0261766 A1 Nov. 23, 2006

(30) Foreign Application Priority Data

May 18, 2005 (JP) .......................... P2005-145429

(51) Int. Cl.
- H02K 21/00 (2006.01)
- H02K 23/00 (2006.01)
- H02K 31/00 (2006.01)
- H02P 1/18 (2006.01)
- H02P 3/08 (2006.01)

(52) U.S. Cl. ...................... 318/254; 318/599; 318/811; 318/819; 318/823; 318/700

(58) Field of Classification Search ..................... None
See application file for complete search history.

(56) References Cited

FOREIGN PATENT DOCUMENTS

| JP | 7-337067 A | 12/1995 |
|----|------------|---------|
| JP | 10-70894 A | 3/1998 |

*Primary Examiner*—Lincoln Donovan
*Assistant Examiner*—Erick Glass
(74) *Attorney, Agent, or Firm*—Sughrue Mion, PLLC (57) ABSTRACT

A drive method for a brushless motor and a drive control apparatus therefor, in which control parameters are calculated by revolution number control means or motor current control means in accordance with the deviation between a target value and an actual value, a manipulated variable is computed by conduction phase control means on the basis of the calculated control parameters, an advance angle magnitude is computed from the relationship between a manipulated variable and an advance angle magnitude as designed and created beforehand, on the basis of the computed manipulated variable, and the value of a conduction phase angle of a drive circuit as designed on the basis of a rotation position signal or a motor current signal is corrected using the information of the computed advance angle magnitude.

9 Claims, 6 Drawing Sheets

DRIVE METHOD FOR BRUSHLESS MOTOR AND DRIVE CONTROL APPARATUS THEREFOR

BACKGROUND OF THE INVENTION

1. Field of the Invention

This invention relates to a drive method for a brushless motor and a drive control apparatus therefor. More particularly, it relates to a drive method for a brushless motor and a drive control apparatus therefor as are well suited for application to a hydraulic type power steering control system employing the brushless motor.

This application is an application relevant to U.S. Patent Application Ser. No. 11/311,332 filed on Dec. 20, 2005 (corresponding Japanese Patent Application: Application No. JP2005-145428 filed on May 18, 2005) by the same inventors as in this application.

2. Description of the Related Art

In recent years, power steering control systems each of which assists the driver of a vehicle in handle manipulation have been often used for the steerability and stability of the driver of the vehicle. The power steering control systems include an electric type and a hydraulic type. As compared with the hydraulic type, the electric type has such merits that assist characteristics which support the driver can be freely set at the time of design, that the versatility of the control system is high, and that the fuel consumption of the vehicle is enhanced. On the other hand, however, the electric type ha-s problems in the steerability and an environmental immunity including heat or noise.

Especially in a large-sized vehicle, therefore, the hydraulic type power steering control system is often adopted. A brushless motor is adopted for the hydraulic type power steering control system. In the hydraulic type power steering control system employing the brushless motor, a hydraulic pump is driven by the brushless motor, and a predetermined assist force as designed can be realized by a controlled hydraulic pressure in accordance with a vehicle running condition such as a vehicle speed or a steering angle rate.

In general, the hydraulic type power steering control system adopting the brushless motor stores the relationship between the vehicle speed or the steering angle rate and the designed revolution number of the brushless motor, in the microcomputer (hereinbelow, termed "memory") of the control system beforehand. Besides, the revolution number of the brushless motor is detected by a sensor for detecting the motor rotation position of the brushless motor, the deviation between the actual revolution number detected and the target revolution number stored in the memory is calculated, and the revolution number of the brushless motor is controlled so that the value of the deviation may become, at most, a predetermined value as designed, whereby the assist force required by the driver is obtained. Such a control technique is partly disclosed in, for example, JP-A-10-70894.

Also, JP-A-7-337067 states the fact that the conduction phase angle of a motor drive circuit is controlled on the basis of the revolution number and current of the brushless motor.

JP-A-10-70894

JP-A-7-337067

With the prior-art control technique disclosed in JP-A-10-70894, the drive timing (hereinbelow, termed "conduction phase angle") of the pulse width modulation (hereinbelow, abbreviated to "PWM") signal of a drive circuit for driving the brushless motor is set at a fixed angle. Accordingly, no special problem occurs in the brushless motor in the state where it revolves at a constant speed. However, in a case where a variable speed is required, there is such a problem that a region in which an efficiency lowers or a consumed current increases appears.

Besides, it is disclosed in JP-A-7-337067 that the conduction phase angle of the drive circuit for the brushless motor is controlled on the basis of the revolution number and current of the brushless motor. Thus, advantages such as the enhancement of an efficiency and the decrease of a consumed current are noted in a steady running state at a predetermined revolution number. In order to perform a control in a wider range of revolution numbers, however, the responsibility of the conduction phase angle of PWM needs to be heightened.

SUMMARY OF THE INVENTION

This invention has been made in order to solve the problems of the prior-art control techniques as stated above. An object of the invention is to provide a drive method for a brushless motor and a drive control apparatus therefor as can attain the higher efficiency of the brushless motor and decrease the consumption current thereof in a wider region, especially in a low-load region and a high-speed revolution region, and in a high-load region and a low-speed revolution region.

Another object of the invention is to provide a drive method for a brushless motor and a drive control apparatus therefor as are well suited for application to a hydraulic type power steering system which employs the brushless motor for driving an electrically-operated pump.

A drive method for a brushless motor according to this invention consists in a drive method for a brushless motor, comprising a first drive method in which control parameters are calculated in accordance with a deviation between a target revolution number and an actual revolution number, and the revolution number of the brushless motor is controlled by a drive circuit that subjects the brushless motor to drive of PWM on the basis of the calculated control parameters, and in which a conduction phase angle of the drive circuit is controlled on the basis of a rotation position signal of a rotation position sensor that detects a rotation position of the brushless motor; and a second drive method in which control parameters are calculated in accordance with a deviation between a target motor current value and an actual motor current value, and the motor current value of the brushless motor is controlled by a drive circuit that subjects the brushless motor to drive of PWM on the basis of the calculated control parameters, and in which a conduction phase angle of the drive circuit is controlled on the basis of a motor current signal of a motor current detection sensor that detects the motor current value of the brushless motor; wherein when a running state of the brushless motor is in a low-load region and a high-speed revolution region, the brushless motor is driven by the first drive method, and when the running state is in a high-load region and a low-speed revolution region, the brushless motor is driven by the second drive method, and besides, a manipulated variable is computed on the basis of the calculated control parameters, an advance angle magnitude is computed from a corresponding map of a manipulated variable and an advance angle magnitude as created beforehand, on the basis of the computed manipulated variable, and a value of the conduction phase angle of the drive circuit as designed on the basis of either of the rotation position signal and the motor current signal is corrected with information of the computed advance angle magnitude.

Besides, a drive control apparatus for a brushless motor according to this invention consists in a drive control apparatus for a brushless motor, comprising first drive control means for calculating control parameters by revolution number control means in accordance with a deviation between a target revolution number and an actual revolution number, and controlling a drive circuit by control means of PWM on the basis of the calculated control parameters, so as to control the revolution number of the brushless motor, and for controlling a conduction phase angle of the drive circuit on the basis of a rotation position signal of a rotation position detection sensor which detects a rotation position of the brushless motor; second drive control means for calculating control parameters by motor current control means in accordance with a deviation between a target motor current value and an actual motor current value, and controlling a drive circuit by control means of PWM on the basis of the calculated control parameters, so as to control the motor current value of the brushless motor, and for controlling a conduction phase angle of the drive circuit on the basis of a motor current signal of a motor current detection sensor which detects the motor current value of the brushless motor; selection means for detecting a running state of the brushless motor, and for selecting the first drive control means when the running state is in a low-load region and a high-speed revolution region, and selecting the second drive control means when the running state is in a high-load region and a low-speed revolution region; and conduction phase control means for computing a manipulated variable on the basis of the calculated control parameters, computing an advance angle magnitude on the basis of the computed manipulated variable, and feeding the control means of PWM with computed advance angle information; wherein the control means of PWM corrects a value of the conduction phase angle of the drive circuit as designed on the basis of either of the rotation position signal and the motor current signal, with the information of advance angle magnitude from the conduction phase control means.

According to this invention, there are provided a drive method for a brushless motor and a drive control apparatus therefor, in which an efficiency is high, and a consumption current can be decreased, in the wider region of the brushless motor, especially in the high-speed revolution region and low-load region thereof and the low-speed revolution region and high-load region thereof.

Moreover, there are provided a drive method for a brushless motor and a drive control apparatus therefor, which are well suited for application to a hydraulic type power steering system employing the brushless motor.

DETAILED DESCRIPTION OF THE INVENTION

Embodiment 1

In general, the control of a motor subjects drive transistors to PWM drive so as to zeroize the deviation between a set target motor revolution number and an actual revolution number. Usually, a PID control (where P denotes a proportional control, I denotes an integral control, and D denotes a differential control) is performed in accordance with the deviation. With only the PID control, however, the conduction phase angle of a motor drive circuit becomes constant. In order to solve the problems of the prior art as stated above, therefore, the conduction phase angle needs to be controlled using any means.

In this invention, in the low-load region and high-speed revolution region of the motor, the conduction phase angle is controlled using control parameters, namely, a P term (proportion term), an I term (integration term) and a D term (differentiation term), obtained on the basis of the deviation between the target motor revolution number and the actual revolution number, thereby to enhance a motor efficiency and the responsibility of the revolution number, and in the high-load region and low-speed revolution region of the motor, the conduction phase angle is controlled using the control parameters, namely, the P term (proportion term), the I term (integration term) and the D term (differentiation term), obtained on the basis of the deviation between a target motor current value and an actual motor current value, thereby to enhance the motor efficiency.

Now, a drive method for a brushless motor and a drive control apparatus therefor in Embodiment 1 of this invention will be described with reference to FIGS. 1 through 9. Incidentally, throughout the drawings, the same reference numerals indicate identical or corresponding parts.

Figure 1:
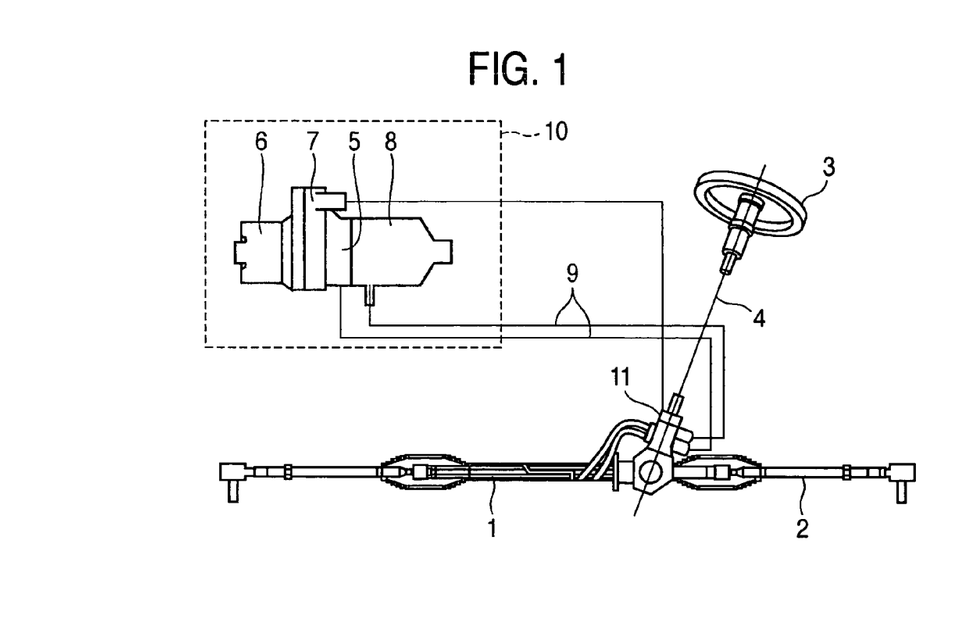
FIG. 1 is a configurational view of a hydraulic type power steering control system including an electrically-operated pump, to which this invention is applied.

FIG. 1 is a view showing the configuration of a hydraulic type power steering control system which employs a brushless motor for driving an electrically-operated pump, and to which this invention is applied.

Referring to FIG. 1, numeral 1 designates a steering gear, numeral 2 tie rods, numeral 3 a steering handle, numeral 4 a steering shaft, numeral 5 the oil pump, numeral 6 the DC brushless motor, numeral 7 a controller, numeral 8 an oil tank, numeral 9 hydraulic pipes, and numeral 10 an oil pump section.

Figure 2:
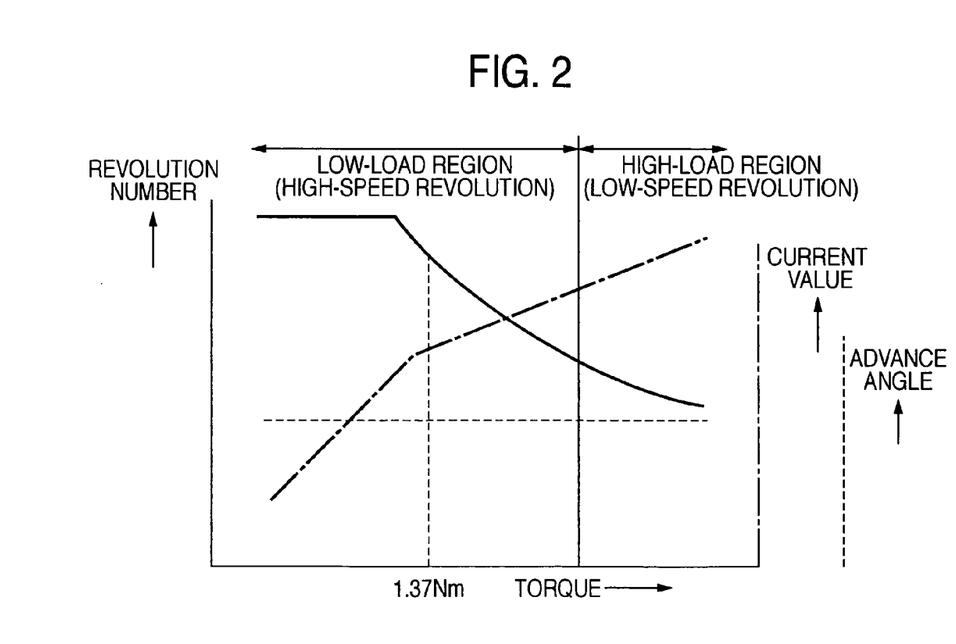
FIG. 2 is a conceptual diagram showing the low-load region and high-speed revolution region of a brushless motor, and the high-load region and low-speed revolution region thereof.

FIG. 2 is a conceptual diagram showing a low-load region and a high-speed revolution region, and a high-load region and a low-speed revolution region in the brushless motor. This diagram shows the relationship among a revolution number, a torque, and a current value as well as an advance angle.

Figure 3:
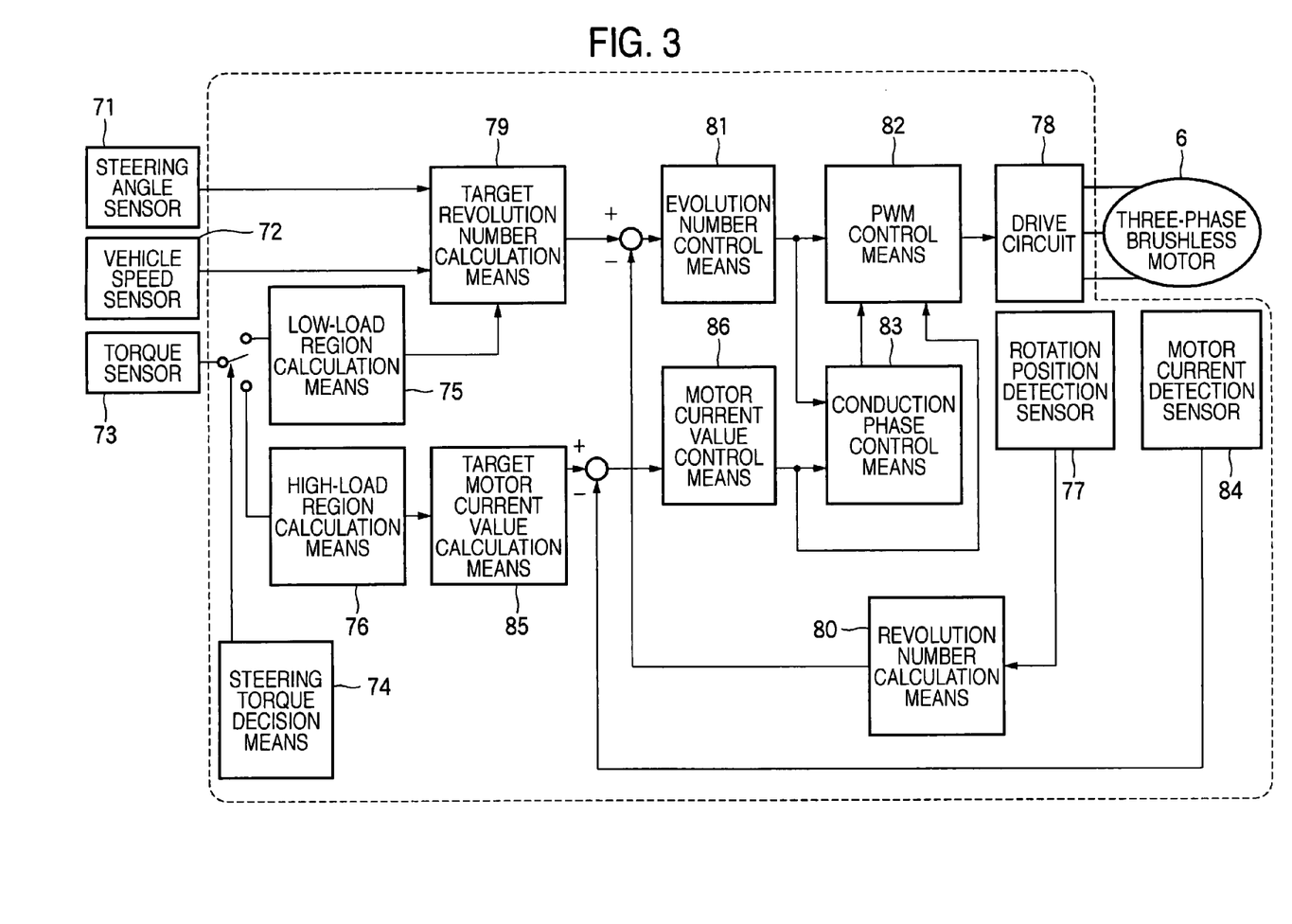
FIG. 3 is a control block diagram of a drive control apparatus for the brushless motor, in Embodiment 1 of this invention.

FIG. 3 is a control block diagram of the controller 7 which performs the drive control of the brushless motor 6. Referring to FIG. 3, numeral 71 designates a steering angle sensor, numeral 72 a vehicle speed sensor, numeral 73 a torque sensor, numeral 74 steering torque decision means, numeral 75 low-load region calculation means, numeral 76 high-load region calculation means, numeral 77 a rotation position detection sensor, numeral 78 a drive circuit, numeral 79 target revolution number calculation means, numeral 80 revolution number calculation means, numeral 81 revolution number control means, numeral 82 PWM control means, numeral 83 conduction phase control means, numeral 84 a motor current detection sensor, numeral 85 target motor current calculation means, and numeral 86 motor current control means.

Figure 4:
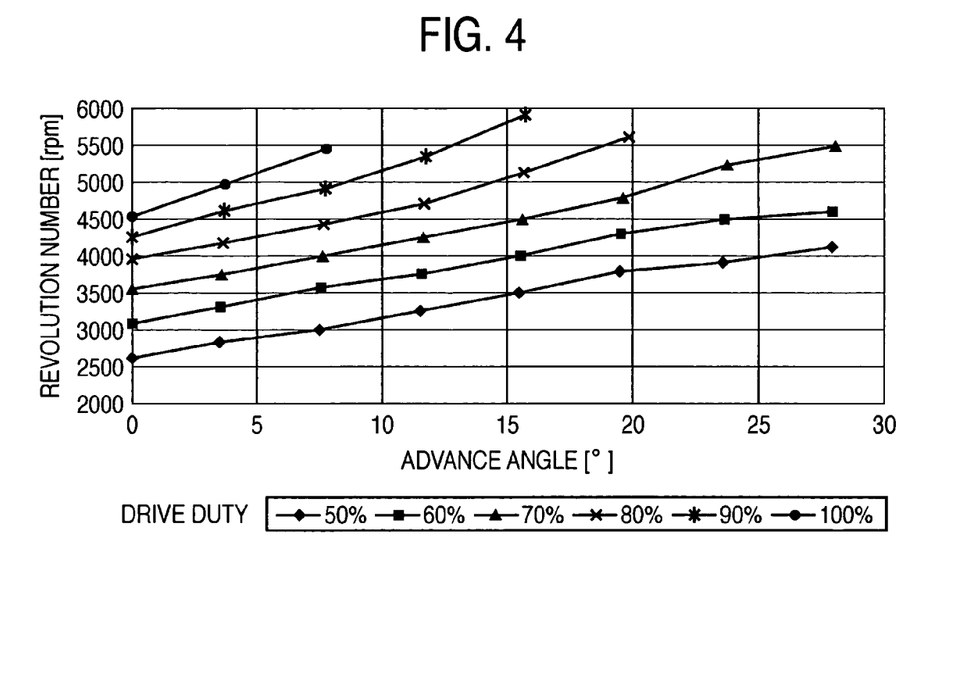
FIG. 4 is a graph showing the relationships in the brushless motor among the drive duty of a PWM drive circuit, a conduction phase angle and a motor revolution number.

FIG. 4 is a graph showing the relationships in the brushless motor among the drive duty of the PWM drive circuit, a conduction phase angle and the motor revolution number.

Figure 5:
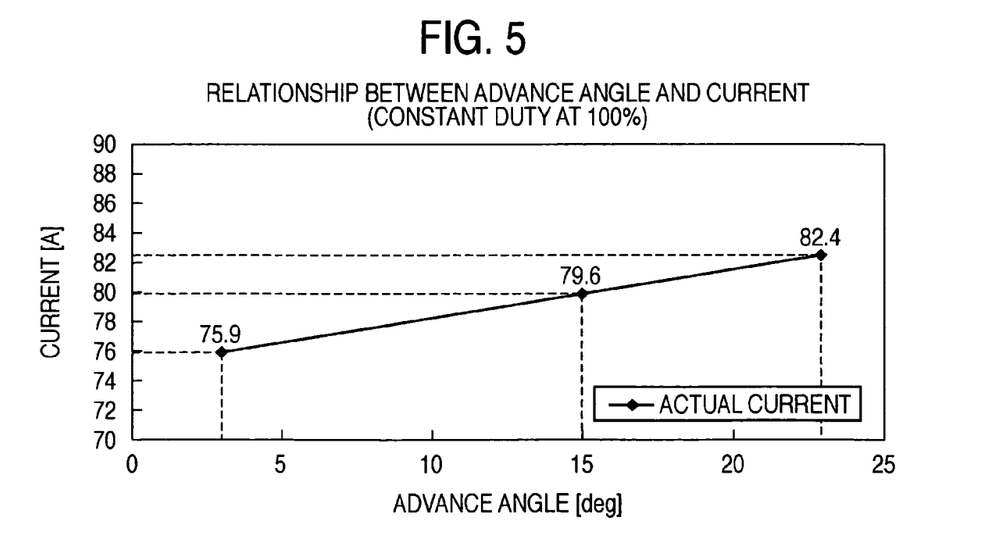
FIG. 5 is a graph showing the relationship between an advance angle and a current in order to explain an operating principle in the high-load region and the low-speed revolution region in Embodiment 1 of this invention.

FIG. 5 is a graph showing the relationship between the advance angle and a current in order to explain an operating principle in the high-load region and the low-speed revolution region in Embodiment 1.

Figure 6:
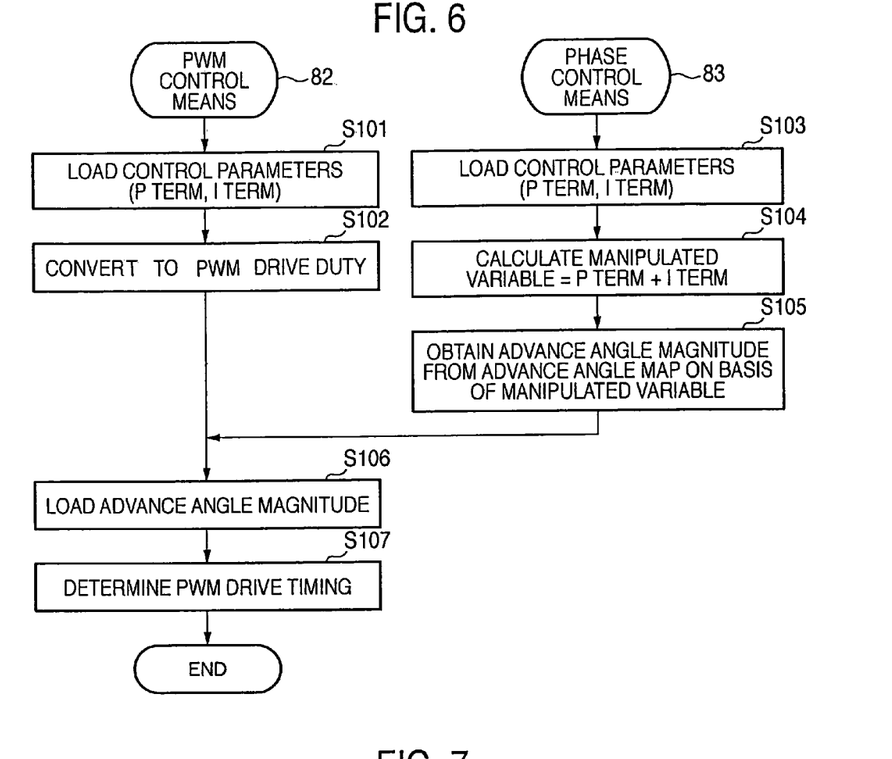
FIG. 6 is a control flow chart for explaining the operations of phase control means and PWM control means in Embodiment 1 of this invention.

FIG. 6 is a control flow chart for explaining the operations of the phase control means 83 and the PWM control means 82. In FIG. 6, signs S101 through S107 indicate the respective steps of a control flow.

Figure 7:
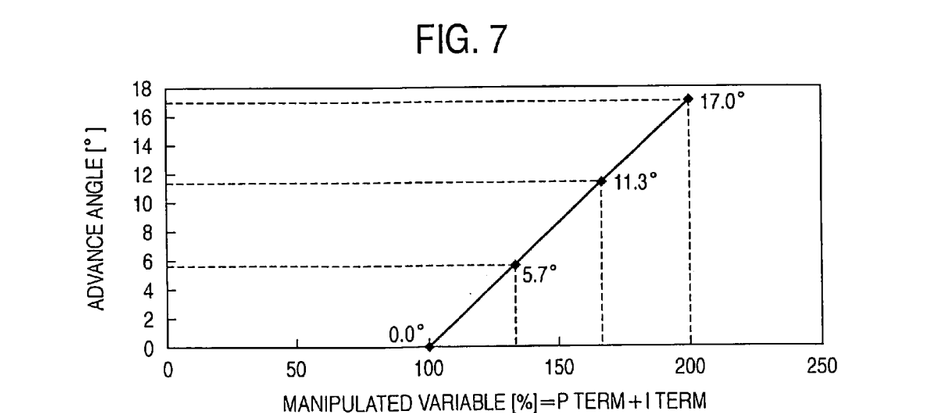
FIG. 7 is a diagram showing an example of an advance angle map in Embodiment 1 of this invention.

FIG. 7 is a diagram showing an example of an advance angle map in Embodiment 1 of this invention.

Figure 8A:
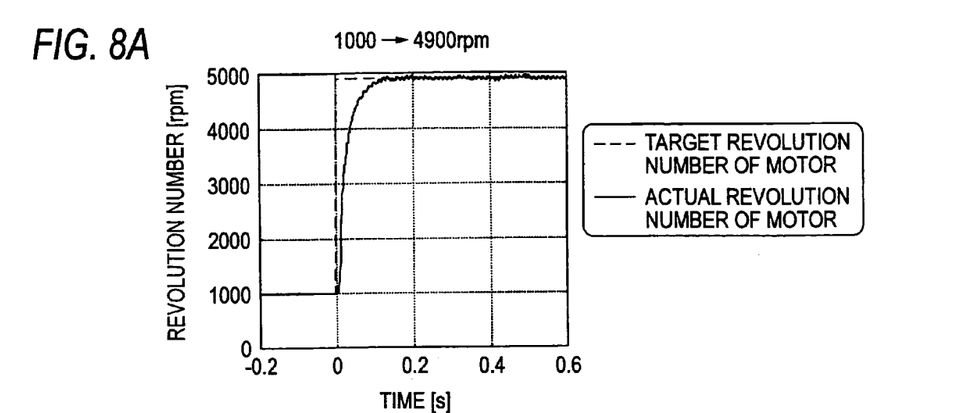
FIGS. 8A through 8C are graphs for explaining the revolution number responsibility of the brushless motor in Embodiment 1 of this invention.
Figure 8B:
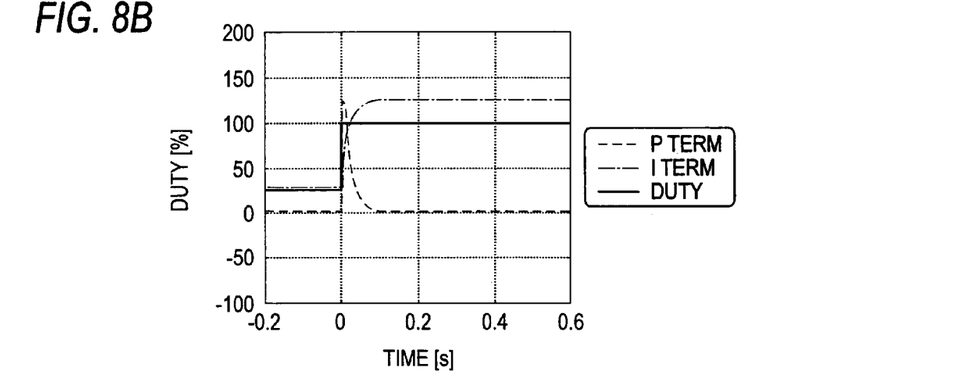
Figure 8C:
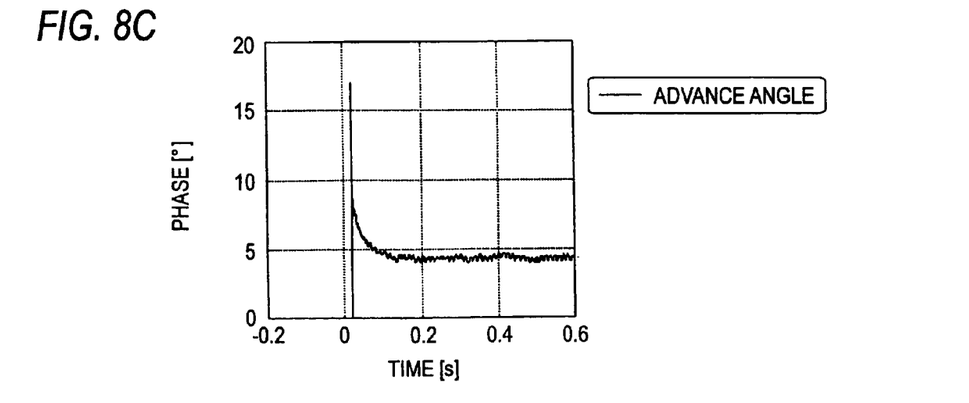

FIGS. 8A through 8C are graphs for explaining the revolution number responsibility of the brushless motor in Embodiment 1 of this invention.

Figure 9:
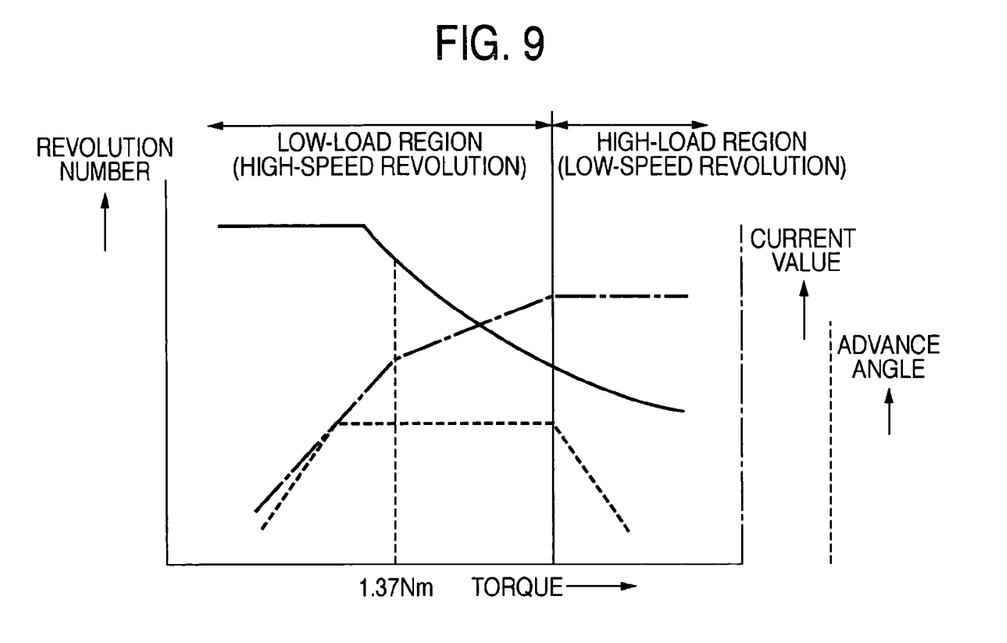
FIG. 9 is a conceptual diagram for explaining the advantages of Embodiment 1 of this invention.

FIG. 9 is a conceptual diagram for explaining the advantages of Embodiment 1 of this invention.

As shown in FIG. 1, the steering gear 1 is provided with the tie rods 2 which are connected through knuckle arms to the right and left steering wheels of an automobile or the like vehicle not shown.

As is well known, the steering gear 1 includes a flow path changeover valve which changes-over hydraulic flow paths in such a way that the steering manipulation of the steering handle 3 is transmitted thereto by the steering shaft 4, a transmission section which transmits the steering manipulation onto the side of the tie rods 2, and a power cylinder which generates an assist force corresponding to the steering manipulation, by introducing a hydraulic pressure into either of the right and left chambers thereof.

Besides, the oil pump section 10 is driven by the electrically-operated motor so as to feed a pressurized oil to the steering gear 1 through either of the hydraulic pipes 9. This oil pump section 10 is configured of the oil pump 5, the DC brushless motor 6 which is the electrically-operated motor for driving the pump 5, the oil tank 8 which is made of a casing covering the periphery of the pump 5, and the controller 7 which optimally controls the electrically-operated motor.

Besides, a low-load region and a high-speed revolution region, and a high-load region and a low-speed revolution region in the brushless motor are shown in FIG. 2. This figure shows the revolution number and torque of the motor, the current value and torque of the motor, and the advance angle magnitude of motor rotation in a 180° conduction mode. The present advance angle magnitude is fixed at 17 degrees in order to fulfill a specification of 1.37 Nm. In a no-load condition or a high-speed revolution condition, however, a wasteful current is consumed because the fixed advance angle magnitude lies on an advance angle side. Also in a high-load condition or a low-speed revolution condition, a current loss is observed as shown in FIG. 2.

As shown in FIG. 3, the DC brushless motor 6 is a three-phase motor, and it is subjected to PWM drive by the drive circuit 78 which includes six power transistors not shown.

The running state of the motor 6 is decided as either the low-load region or the high-load region by the steering torque decision means 74 on the basis of an input signal from the torque sensor 73. In a case where the running state has been decided as the low-load region, the drive control of the motor 6 proceeds to the target revolution number calculation means 79 via the low-load region calculation means 75.

The target revolution number calculation means 79 calculates the target revolution number of the DC brushless motor 6 as stored in a memory beforehand, on the basis of the signal of the steering angle sensor 71 for detecting a steering angle and a steering angle rate involved in the steering manipulation of the vehicle, and the signal of the vehicle speed sensor 72 for detecting a vehicle speed.

On the other hand, the rotor rotation position of the DC brushless motor 6 is detected by the rotation position detection sensor 77. A rotation position signal from the rotation position detection sensor 77 is inputted to the revolution number calculation means 80, so as to calculate the actual revolution number of the motor 6 on the basis of the rotation position signal.

Subsequently, the deviation between the target revolution number calculated by the target revolution number calculation means 79 and the actual revolution number calculated by the revolution number calculation means 80 is inputted to the revolution number control means 81.

As disclosed in JP-A-2001-103776 by way of example, the revolution number control means 81 and the PWM control means 82 can be so configured that the actual revolution number is fed back, that a control voltage is set by the proportional control and the integral control on the basis of the deviation of the actual revolution number from the target revolution number, and that the PWM drive of the drive circuit 78 is controlled with the control voltage so as to control the revolution number of the motor 6.

In Embodiment 1 of this invention, a proportion term and an integration term or the like control elements based on the deviation are calculated by the revolution number control means 81, and a PWM drive duty is calculated from the calculated result of the means 81 by the PWM control means 82. Besides, the optimum conduction phase angle of the drive circuit 78 is obtained by the conduction phase control means 83 on the basis of the control elements, such as the proportion term, integration term and differentiation term, based on the revolution deviation as calculated by the revolution number control means 81, and the obtained result is reflected on the operation of the PWM control means 82.

Besides, in a case where the running state has been decided as the high-load region by the steering torque decision means 74 on the basis of the input signal from the torque sensor 73, the drive control proceeds to the target motor current calculation means 85 via the high-load region calculation means 76.

The target motor current calculation means 85 calculates the target motor current value of the DC brushless motor 6 as stored in the memory beforehand.

On the other hand, the actual motor current value of the DC brushless motor 6 is detected by the motor current detection sensor 84. A detected motor current signal from the motor current detection sensor 84 is compared with the target motor current value calculated by the target motor current calculation means 85, and the resulting deviation of the comparison is inputted to the motor current control means 86.

The motor current control means 86 and the PWM control means 82 operate in such a way that the actual motor current value is fed back, that a proportion term and an integration term or the like control parameters based on the deviation of the actual motor current value from the target motor current value are calculated by the motor current control means 86, and that a PWM drive duty is calculated from the result of the calculation of the means 86 by the PWM control means 82. Besides, the optimum conduction phase angle of the drive circuit 78 is obtained by the conduction phase control means 83 on the basis of the control parameters, such as the proportion term, integration term and differentiation term, based on the deviation as calculated by the motor current control means 86, and the obtained result is reflected on the operation of the PWM control means 82.

A method of controlling the conduction phase angle of the drive circuit 78, in the conduction phase control means 83, will be described below.

As shown in FIG. 4, the revolution number being the output of the motor rises with the increase of the PWM drive duty, and it increases with the advance angle of the conduction phase angle at the identical PWM drive duty.

In the revolution number control, therefore, the motor is driven at the advance angle of the conduction phase angle having a small drive current, in a region where the motor output exceeds a load torque (drive duty<100% holds) even when the conduction phase angle is not advanced. Accordingly, the advance angle magnitude is set at zero till the drive duty of 100%, and it is fixed when the drive duty has reached 100%.

Incidentally, the "drive duty" is the conduction factor of the motor drive circuit as converted from the control parameters, such as the proportion, integration and differentiation terms, based on the deviation between the target revolution number and the actual revolution number in the motor revolution number control.

FIG. 5 shows the relationship between the conduction phase angle and the motor current. When the conduction phase angle is changed by driving the motor at the constant PWM drive duty of 100%, the motor current value becomes larger with the advance angle magnitude as shown in FIG. 5.

On the other hand, in the high-load region in which the load torque exceeds the motor output, a current feedback control needs to be performed so that the motor current value may not exceed its rated value. In this regard, it is permitted to control the motor current by changing the conduction phase angle without changing the PWM drive duty. Incidentally, the "drive duty" is the conduction factor of the motor drive circuit as converted from the control parameters, such as the proportion, integration and differentiation terms, based on the deviation between the target current value and the actual current value in the motor current control.

Next, the operations of the conduction phase control means 83 and the PWM control means 82 will be described with reference to FIG. 6. The steps S101 through S107 proceed as shown in FIG. 6:

(1) At the step S101, the PWM control means 82 loads thereinto the control parameters (proportion term: P term, and integration term: I term) calculated by the revolution number control means 81 or the motor current control means 86.

(2) At the step S102, the PWM control means 82 calculates the PWM drive duty on the basis of the control parameters loaded at the step S101.

(3) On the other hand, the conduction phase control means 83 loads thereinto the control parameters at the step S103, in the same manner as at the step S101.

(4) At the step S104, the phase control means 83 calculates a manipulated variable on the basis of the control parameters. In Embodiment 1, the manipulated variable is the sum of the proportion term (P term) and the integration term (I term).

(5) At the step S105, the phase control means 83 obtains the advance angle magnitude on the basis of the manipulated variable, from an advance angle map which has been created beforehand and which is held stored in the unshown memory of the controller 7.

FIG. 7 shows an example of the advance angle map, in which the advance angle magnitude is set so as to increase when the manipulated variable exceeds 100%.

Besides, as shown in FIG. 9, the advance angle magnitude is set so as to decrease from a stage at which a predetermined high load is exceeded, the revolution number lies in the low-speed revolution region and the advance angle holds a constant value, whereby the rise of the motor current value is suppressed.

(6) At the step S106, the PWM control means 82 loads thereinto the advance angle magnitude obtained at the step S105.

(7) At the step S107, the PWM control means 82 calculates the conduction phase angle (PWM drive timing) on the basis of the loaded advance angle magnitude.

Incidentally, although the manipulated variable is set at the sum of the proportion term (P term) and integration term (I term) of the control parameters at the step S104, the remaining differentiation term (D term) may well be added. Besides, it is a matter of course that the manipulated variable need not always be set at the sum of the terms, but that it can be calculated on the basis of the terms multiplied by coefficients or the product of the terms.

FIGS. 8A through 8C show an example of a result which has been obtained by verifying the revolution number responsibility of the brushless motor by employing the drive control apparatus for the brushless motor in Embodiment 1 described above.

More specifically, FIG. 8A shows the actual revolution number in the case where the target revolution number was changed stepwise from 1000 rpm to 4900 rpm, FIG. 8B shows the drive duty and the proportion term (P term) and integration term (I term) of the control parameters, and FIG. 8C shows the advance angle magnitude.

As seen from FIGS. 8A through 8C, in order to ensure the responsibility, the drive duty is set at 100%, and the motor is driven in accordance with the advance angle magnitude corresponding to the proportion term (P term), immediately after the change of the target revolution number, and the revolution number is thereafter maintained in accordance with the advance angle magnitude corresponding to the integration term (I term).

Since this advance angle magnitude is smaller than an advance angle magnitude conforming to the maximum motor output in the prior art, the consumption current of the brushless motor is decreased.

As described above, the drive method and the drive control apparatus for the brushless motor according to Embodiment 1 of this invention is such that, in a low-load region and a high-speed revolution region, in addition to the prior-art conduction phase control of a drive circuit as based on the rotation position signal of a rotation position detection sensor, a conduction phase angle is determined using control parameters, namely, a proportion term (P term), an integration term (I term) and a differentiation term (D term) as obtained from the deviation between a target motor revolution number and an actual revolution number, whereupon a conduction phase angle set on the basis of the rotation position signal is corrected on the basis of the information of the determined conduction phase angle.

Besides, in a high-load region and a low-speed revolution region, a conduction phase angle is determined using control parameters, namely, a proportion term (P term), an integration term (I term) and a differentiation term (D term) as obtained from the deviation between a target motor current value and an actual motor current value, whereupon a conduction phase angle set on the basis of the motor current signal of a motor current detection sensor is corrected on the basis of the information of the determined conduction phase angle.

Consequently, according to the drive method and the drive control apparatus for the brushless motor in Embodiment 1 of this invention, in the low-load region and the high-speed revolution region, the motor has a high efficiency, it can decrease its consumption current, and it can exhibit an excellent responsibility corresponding to a revolution number change, and in the high-load region and the low-speed revolution region, the motor current of the brushless motor can be controlled by delaying the advance angle of motor rotation, the efficiency of the motor can be enhanced, and the consumption current can be decreased.

Besides, a manipulated variable is calculated using at least one of the proportion term for a proportional control, the integration term for an integral control and the differentiation term for a differential control as are the control parameters, so that the control can be performed with the optimum conduction phase angle in each load region, the motor efficiency is high, and the consumption current can be decreased.

Further, the drive duty of the drive circuit is calculated on the basis of the calculated control parameters, and the motor drive is controlled so that, when the calculated drive duty is, at least, a predetermined value as designed, the value of the conduction phase angle of the drive circuit may be corrected. Therefore, a region in which the PWM drive duty can be set at the predetermined value (100%) or above is expanded, whereby a switching loss can be relieved to attain a high efficiency and to decrease the consumption current.

Moreover, the drive method and drive control apparatus for the brushless motor in Embodiment 1 described above can be incorporated into a hydraulic type power steering control system employing the brushless motor for driving an electrically-operated pump, so that the hydraulic type power steering control system which is suited to assist a vehicle driver in handle manipulation can be realized at a low fuel consumption.

Although this invention has been described above in detail in connection with Embodiment 1, various changes and modifications are apparent to those skilled in the art, and they shall be covered within the scope of the invention.

What is claimed is:

1. A drive method for a brushless motor, comprising:
   a first drive method in which control parameters are calculated in accordance with a deviation between a target revolution number and an actual revolution number, the revolution number of the brushless motor is controlled by a drive circuit that subjects the brushless motor to drive by a pulse width modulation (PWM) signal on the basis of the calculated control parameters, and wherein a conduction phase angle of the drive circuit is controlled on the basis of a rotation position signal of a rotation position sensor that detects a rotation position of the brushless motor; and
   a second drive method in which control parameters are calculated in accordance with a deviation between a target motor current value and an actual motor current value, the motor current value of the brushless motor is controlled by a drive circuit that subjects the brushless motor to drive by the PWM signal on the basis of the calculated control parameters, and wherein a conduction phase angle of the drive circuit is controlled on the basis of a motor current signal of a motor current detection sensor that detects the motor current value of the brushless motor;
   wherein;
   when a running state of the brushless motor is in a low-load region and a high-speed revolution region, the brushless motor is driven by said first drive method, and
   when the running state is in a high-load region and a low-speed revolution region, the brushless motor is driven by said second drive method,
   a manipulated variable is computed on the basis of the calculated control parameters,
   an advance angle magnitude is computed on the basis of the computed manipulated variable from a prestored map that corresponds manipulated variables with advance angle magnitudes, and
   a value of the conduction phase angle of the drive circuit, based on either of the rotation position signal and the motor current signal, is corrected using the computed advance angle magnitude.

2. A drive method for a brushless motor as defined in claim 1, wherein the manipulated variable is computed using at least one member selected from the group consisting of a proportion term for a proportional control, an integration term for an integral control and a differentiation term for a differential control, as are the control parameters.

3. A drive method for a brushless motor as defined in claim 1, wherein the manipulated variable is computed using a proportion term for a proportional control, an integration term for an integral control and a differentiation term for a differential control, as are the control parameters.

4. A drive method for a brushless motor as defined in claim 1, wherein a drive duty of the drive circuit is computed on the basis of the control parameters, and the value of the conduction phase angle of the drive circuit is corrected when the computed drive duty is, at least, a predetermined value.

5. A drive control apparatus for a brushless motor, comprising:
   a first drive control means for calculating control parameters by a revolution number control means, in accordance with a deviation between a target revolution number and an actual revolution number, the first drive control means controlling a drive circuit by a pulse width modulation (PWM) conrol means, on the basis of the calculated control parameters, so as to control the actual revolution number of the brushless motor, and the first drive control means controlling a conduction phase angle of the drive circuit on the basis of a rotation position signal of a rotation position detection sensor which detects a rotation position of the brushless motor;

a second drive control means for calculating control parameters by a motor current control means, in accordance with a deviation between a target motor current value and an actual motor current value, the second drive control means controlling a drive circuit by the PWM control means, on the basis of the calculated control parameters, so as to control the actual motor current value of the brushless motor, and the second drive control means controlling a conduction phase angle of the drive circuit on the basis of a motor current signal of a motor current detection sensor which detects the motor current value of the brushless motor;

a selection means for detecting a running state of the brushless motor, and for selecting said first drive control means when the running state is in a low-load region and a high-speed revolution region, and selecting said second drive control means when the running state is in a high-load region and a low-speed revolution region; and a conduction phase control means for computing a manipulated variable on the basis of the calculated control parameters, computing an advance angle magnitude on the basis of the computed manipulated variable, and feeding computed advance angle information to the PWM control means;

wherein the PWM control means corrects a value of the conduction phase angle of the drive circuit on the basis of either the rotation position signal and the motor current signal, with the advance angle magnitude from said conduction phase control means.

6. A drive control apparatus for a brushless motor as defined in claim 5, wherein said conduction phase control means computes the manipulated variable by using at least one member selected from the group consisting of a proportion term for a proportional control, an integration term for an integral control and a differentiation term for a differential control, as are the control parameters.

7. A drive control apparatus for a brushless motor as defined in claim 5, wherein said conduction phase control means computes the manipulated variable by using a proportion term for a proportional control, an integration term for an integral control and a differentiation term for a differential control, as are the control parameters.

8. A drive control apparatus for a brushless motor as defined in claim 5, wherein a drive duty of the drive circuit is computed on the basis of the control parameters, and the value of the conduction phase angle of the drive circuit is corrected when the computed drive duty is, at least, a predetermined value.

9. A hydraulic type power steering control system comprising the drive control apparatus as defined in claim 5, for the brushless motor for driving a hydraulic pump.

* * * * *